US009468084B2

(12) United States Patent
Kumar et al.

(10) Patent No.: US 9,468,084 B2
(45) Date of Patent: Oct. 11, 2016

(54) PLASMA GENERATION DEVICE ASSEMBLY, ARC MITIGATION DEVICE, AND METHOD OF ASSEMBLING A PLASMA GENERATION DEVICE ASSEMBLY

(71) Applicant: General Electric Company, Schenectady, NY (US)

(72) Inventors: Ravi Kumar, Bangalore (IN); Srinivas Naga Palvadi, Secunderabad (IN); Sudhakar Sambaiah Pachunoori, Hyderabad (IN)

(73) Assignee: General Electric Company, Schenectady, NY (US)

( * ) Notice: Subject to any disclaimer, the term of this patent is extended or adjusted under 35 U.S.C. 154(b) by 779 days.

(21) Appl. No.: 13/663,913

(22) Filed: Oct. 30, 2012

(65) Prior Publication Data

US 2014/0118879 A1 May 1, 2014

(51) Int. Cl.
*B23K 10/00* (2006.01)
*H05H 1/52* (2006.01)

(52) U.S. Cl.
CPC .................................... *H05H 1/52* (2013.01)

(58) Field of Classification Search
CPC ............ H05H 1/52; H05H 1/46; H05H 1/34; Y10T 29/49117
USPC ............ 219/121.36, 121.37, 121.48, 121.49, 219/121.52
See application file for complete search history.

(56) References Cited

U.S. PATENT DOCUMENTS 4,598,186 A 7/1986 Cook et al.
5,502,612 A 3/1996 Osterhout et al.
6,984,987 B2 * 1/2006 Taylor et al. ................ 324/509
7,586,057 B2 9/2009 Sisson et al.
8,053,699 B2 11/2011 Roscoe et al.
2008/0239598 A1 * 10/2008 Asokan et al. ................ 361/56
2009/0134129 A1 5/2009 Robarge et al.
2010/0301021 A1 12/2010 Bohori et al.
2013/0329325 A1 * 12/2013 Ganireddy et al. ............ 361/56
2014/0160634 A1 * 6/2014 Palvadi et al. ............... 361/600

OTHER PUBLICATIONS

McBride et al., "Arc Root Commutation From Moving Contacts in Low Voltage Devices", Transactions On Components And Pakaging Technologies, vol. 24, Issue 3, Sep. 2001.
Shea et al., "Dielectric Recovery Characteristics of a High Current Arcing Gap", Proceedings of the Forty-Seventh IEEE Holm Conference on Electrical Contacts, pp. 154-160, 2001.
Degui et al., "Experimental Investigation on Arc Motion of MCCB with Different Configurations of Arc Chamber using Optical Fiber Measurement System", pp. 341-346, Sep. 20-23, 2004.
Wang et al., "Simulation of the Venting Configuration Effects on Arc Plasma Motion in Low-Voltage Circuit Breaker", Transactions on Plasma Science, vol. 38, Issue 9, pp. 2300-2305, Sep. 2010.

* cited by examiner

*Primary Examiner* — Mark Paschall
(74) *Attorney, Agent, or Firm* — General Electric Company

(57) ABSTRACT

A plasma generation device assembly includes a base including a top surface. The plasma generation device assembly also includes a plasma generation device and a plurality of coupling members. The plasma generation device includes a body unitarily formed from an ablative material and a plurality of plasma generation device terminals coupled to the body. The plasma generation device is positioned on the top surface and is configured to emit ablative plasma when the plasma generation device is activated. The plurality of coupling members is configured to couple the plasma generation device to the top surface.

29 Claims, 9 Drawing Sheets

PLASMA GENERATION DEVICE ASSEMBLY, ARC MITIGATION DEVICE, AND METHOD OF ASSEMBLING A PLASMA GENERATION DEVICE ASSEMBLY

BACKGROUND OF THE INVENTION

The present application relates generally to power systems and, more particularly, to a plasma generation device assembly, an arc mitigation device, and a method of assembling the plasma generation device assembly.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables arc formation. In addition, arcs may occur as a result of degradation of the insulation due to age, damage to the insulation from rodents, and/or improper maintenance procedures.

An arc flash causes a rapid release of energy due to a fault between phase conductors, between a phase conductor and a neutral conductor, or between a phase conductor and a ground point. Arc flash temperatures can reach or exceed 20,000° C., which can vaporize the conductors and adjacent equipment panels. In addition, an arc flash or fault is associated with a release of a significant amount of energy in the form of heat, intense light, pressure waves, and/or sound waves, which can cause severe damage to the conductors and adjacent equipment.

In general, the fault current and the energy associated with an arc flash event are lower than a fault current and energy associated with a short circuit fault. Due to an inherent delay between closure of a relay and a circuit breaker clearing an arc fault, a significant amount of damage may occur at the location of the fault.

At least some known systems use an arc mitigation system to divert arc energy from the location of the arc flash or fault. The arc mitigation system includes an arc containment device which often includes a plasma generation device that emits ablative plasma towards electrodes within the arc containment device or live terminals terminating inside the containment device when the arc flash event is detected. The ablative plasma reduces or breaks a dielectric strength of the medium, or insulation, between the electrodes, and the medium breaks down such that an electrical arc is formed between the electrodes. The electrical arc diverts energy from the arc flash location until the source of the energy is abated or disconnected.

At least some known plasma generation devices are formed from alternating layers of ablative material and electrodes, or thin conductive material. The layers of ablative material are typically cut from sheets of the ablative material. Known plasma generation devices are assembled manually which requires additional time, skill, and quality of workmanship. The ablative layers and the electrode layers are glued or otherwise bonded together to form the plasma generation device. Polymerized ablative layers may not bond to electrodes with sufficient strength, which may cause cracking and/or debonding between the layers. In addition, during operation of the plasma generation device, the glue may crack or degrade which leads to voltage creep from a high voltage terminal to other terminals proximate to the high voltage terminal along a surface of an ablative layer. In addition, the cutting of the ablative layers may cause the layers to have a non-uniform surface or edge, thus inhibiting a generation of ablative plasma during operation of the plasma generation device.

Furthermore, manual assembly of the plasma generation devices may cause non-uniform clearance between electrodes or conductive paths of the plasma generation device and/or misalignment between the electrodes and a surface that the plasma generation device is coupled to. In addition, the manual assembly process may result in a large number of plasma generation devices failing to meet specifications due to mismatches between electrodes of the plasma generation device, for example. Such mismatches may cause the plasma generation devices to generate insufficient plasma to enable a short circuit to be formed between phases of the arc mitigation device electrodes. A mismatch of the plasma generation device electrodes may cause a contact region between an electrode and a stud or other coupling member that couples the plasma generation device to a surface to become welded together due to a high current source used with the plasma generation device. In addition, electrodes of the plasma generation device may become dislocated as a result of manually positioning the electrodes between ablative sheets. Dislocation of the plasma generation device electrodes blocks a slit area of the electrodes and may block or undesirably scatter the ejection of plasma from the plasma generating device. An uneven application of bonding material to the plasma generation device electrodes may also insulate and/or block the generation of plasma by the plasma generation device.

BRIEF DESCRIPTION OF THE INVENTION

In one aspect, a plasma generation device assembly includes a base including a top surface. The plasma generation device assembly also includes a plasma generation device and a plurality of coupling members. The plasma generation device includes a body unitarily formed from an ablative material and a plurality of plasma generation device terminals coupled to the body. The plasma generation device is positioned on the top surface and is configured to emit ablative plasma when the plasma generation device is activated. The plurality of coupling members is configured to couple the plasma generation device to the top surface.

In another aspect, an arc mitigation device for use in discharging energy from an electrical fault is provided that includes a containment chamber, a plurality of electrodes positioned within the containment chamber, and a plasma generation device assembly positioned within the containment chamber. The plasma generation device assembly includes a base that includes a top surface. The plasma generation device assembly also includes a plasma generation device and a plurality of coupling members. The plasma generation device includes a body unitarily formed from an ablative material and a plurality of plasma generation device terminals coupled to the body. The plasma generation device is positioned on the top surface and is configured to emit ablative plasma when the plasma generation device is activated. The plurality of coupling members is configured to couple the plasma generation device to the top surface.

In yet another aspect, a method of assembling a plasma generation device assembly is provided that includes unitarily forming a plasma generation device body from an ablative material, coupling a plurality of terminals to the plasma generation device body, and coupling the plasma generation device to a cap using a plurality of coupling members. The method also includes coupling a plurality of plasma generation device conductors to the plurality of terminals, and coupling the cap to a pedestal.

DETAILED DESCRIPTION OF THE INVENTION

Exemplary embodiments of a plasma generation device assembly, an arc mitigation device, and a method for assembling a plasma generation device assembly are described herein. The arc mitigation device includes a containment chamber, a plurality of electrodes positioned within the containment chamber, and a plasma generation device assembly positioned within the containment chamber. The plasma generation device assembly includes a hollow pedestal, a cap, and a plasma generation device. A plurality of plasma generation device conductors extend through the pedestal and are coupled to a trigger circuit. The trigger circuit is configured to activate the plasma generation device to discharge ablative plasma towards the electrodes within the containment chamber. The ablative plasma facilitates enabling an electrical arc to form between the electrodes to divert or discharge energy from an electrical fault. In an exemplary embodiment, a body of the plasma generation device is unitarily formed from an ablative material. Accordingly, since the plasma generation device body does not include a plurality of ablative and conductive layers glued together, the plasma generation device body facilitates enabling a consistent generation of ablative plasma through a plurality of activations of the plasma generation device. In addition, in the exemplary embodiment, the unitarily formed plasma generation device body is molded or otherwise formed without using multiple layers of the ablative material (and without requiring the manual assembly process described above), thus enabling a substantially uniform generation of ablative plasma from the plasma generation device body. For example, the molded plasma generation device does not require cutting or gluing of ablative layers or manual positioning of the ablative layers and/or electrodes, and facilitates providing a substantially uniform plasma generation slot within the plasma generation device.

Figure 1:
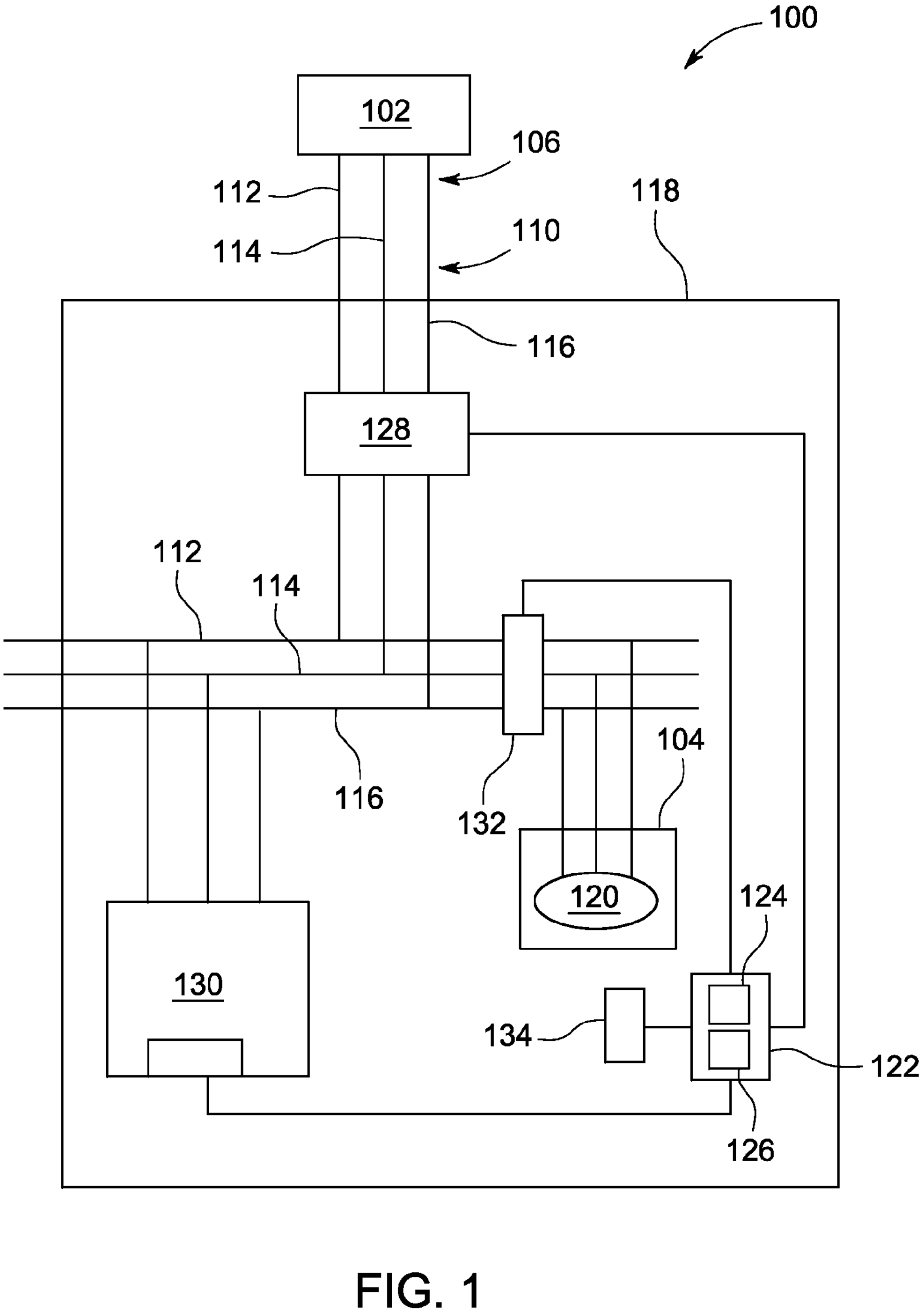
FIG. 1 is a schematic block diagram of an exemplary power distribution system.

FIG. 1 is a schematic block diagram of an exemplary power distribution system 100 that may be used to distribute electrical power (i.e., electrical current and voltage) received from an electrical power source 102 to one or more loads 104. Power distribution system 100 includes a plurality of electrical distribution lines 106 that receive current, such as three phase alternating current (AC), from electrical power source 102. Alternatively, power distribution system 100 may receive any number of phases of current through any suitable number of electrical distribution lines 106 that enables power distribution system 100 to function as described herein.

Electrical power source 102 includes, for example, an electrical power distribution network, or "grid," a steam turbine generator, a gas turbine generator, a wind turbine generator, a hydroelectric generator, a solar panel array, and/or any other device or system that generates electrical power. Loads 104 include, for example, machinery, motors, lighting, and/or other electrical and electromechanical equipment of a manufacturing, power generation, or distribution facility.

Electrical distribution lines 106 are arranged as a plurality of conductors 110. In an exemplary embodiment, conductors 110 include a first phase conductor 112, a second phase conductor 114, and a third phase conductor 116. First phase conductor 112, second phase conductor 114, and third phase conductor 116 are coupled to an equipment protection system 118 for transmitting a first phase of current, a second phase of current, and a third phase of current, respectively, to equipment protection system 118.

In an exemplary embodiment, equipment protection system 118 is a switchgear unit that protects power distribution system 100 and/or loads 104 from an electrical fault that may occur within power distribution system 100. For example, in one embodiment, equipment protection system 118 is a medium voltage switchgear unit that is operable, or rated to operate, at voltages between about 1 kilovolt (kV) and about 52 kV. Alternatively, equipment protection system 118 is operable or rated to operate at any suitable voltage. In an exemplary embodiment, equipment protection system 118 electrically disconnects loads 104 from electrical distribution lines 106 (and from electrical power source 102) to interrupt current if an arc flash event 120 is detected. Alternatively, equipment protection system 118 is any other protection system that enables power distribution system 100 to selectively prevent electrical current from flowing to loads 104.

As used herein, an "arc flash event" refers to a rapid release of energy due to a fault between two electrical conductors. The rapid release of energy may cause acoustic waves and light to be generated proximate the fault, for example, within equipment protection system 118 and/or power distribution system 100.

In an exemplary embodiment, equipment protection system 118 includes a controller 122 that includes a processor 124 and a memory 126 coupled to processor 124. Processor 124 controls and/or monitors operation of equipment protection system 118. Alternatively, equipment protection system 118 includes any other suitable circuit or device for controlling and/or monitoring operation of equipment protection system 118.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Equipment protection system 118 includes a circuit interruption device 128 coupled to first phase conductor 112, second phase conductor 114, and third phase conductor 116. Circuit interruption device 128 is controlled or activated by controller 122 to interrupt current flowing through first phase conductor 112, second phase conductor 114, and third phase conductor 116. In an exemplary embodiment, circuit interruption device 128 includes a circuit breaker, contactor, switch, and/or any other device that enables current to be controllably interrupted by controller 122.

An arc mitigation system 130, or electrical fault mitigation system 130, is coupled to circuit interruption device 128 by first phase conductor 112, second phase conductor 114, and third phase conductor 116. In addition, controller 122 is communicatively coupled to arc mitigation system 130.

In an exemplary embodiment, equipment protection system 118 also includes at least one first, or current, sensor 132 and at least one second sensor 134. Second sensor 134 may include, without limitation, an optical, acoustic, voltage, and/or pressure sensor. Current sensor 132 is coupled to, or positioned about, first phase conductor 112, second phase conductor 114, and third phase conductor 116 for measuring and/or detecting the current flowing through conductors 112, 114, and 116. Alternatively, a separate current sensor 132 is coupled to, or positioned about, each of first phase conductor 112, second phase conductor 114, and third phase conductor 116 for measuring and/or detecting the current flowing therethrough. In an exemplary embodiment, current sensor 132 is a current transformer, a Rogowski coil, a Hall-effect sensor, and/or a shunt. Alternatively, current sensor 132 may include any other sensor that enables equipment protection system 118 to function as described herein. In an exemplary embodiment, each current sensor 132 generates one or more signals representative of the measured or detected current (hereinafter referred to as "current signals") flowing through first phase conductor 112, second phase conductor 114, and/or third phase conductor 116, and transmits the current signals to controller 122.

Second sensor 134, in an exemplary embodiment, measures and/or detects an arc flash event by measuring one or more physical characteristics, such as an amount of light, an acoustic pressure, a reduction in the voltage of power distribution system 100, and/or a barometric pressure generated within equipment protection system 118 by arc flash event 120. Second sensor 134 generates one or more signals representative of the measured or detected physical characteristics (hereinafter referred to as "sensor signals") and transmits the sensor signals to controller 122.

Controller 122 analyzes the current signals and the sensor signals to determine and/or detect whether arc flash event 120 has occurred. More specifically, controller 122 compares the sensor signals and/or current signals to one or more rules or thresholds to determine whether the sensor signals and/or current signals contain indicators of arc flash event 120. If controller 122 determines that arc flash event 120 has occurred based on the sensor signals and/or the current signals, controller 122 transmits a trip signal to circuit interruption device 128, and transmits an activation signal to arc mitigation system 130. Circuit interruption device 128 interrupts current flowing through first phase conductor 112, second phase conductor 114, and third phase conductor 116 in response to the trip signal. Arc mitigation system 130 diverts and/or discharges energy from arc flash event 120 into arc mitigation system 130, as is described more fully herein.

Figure 2:
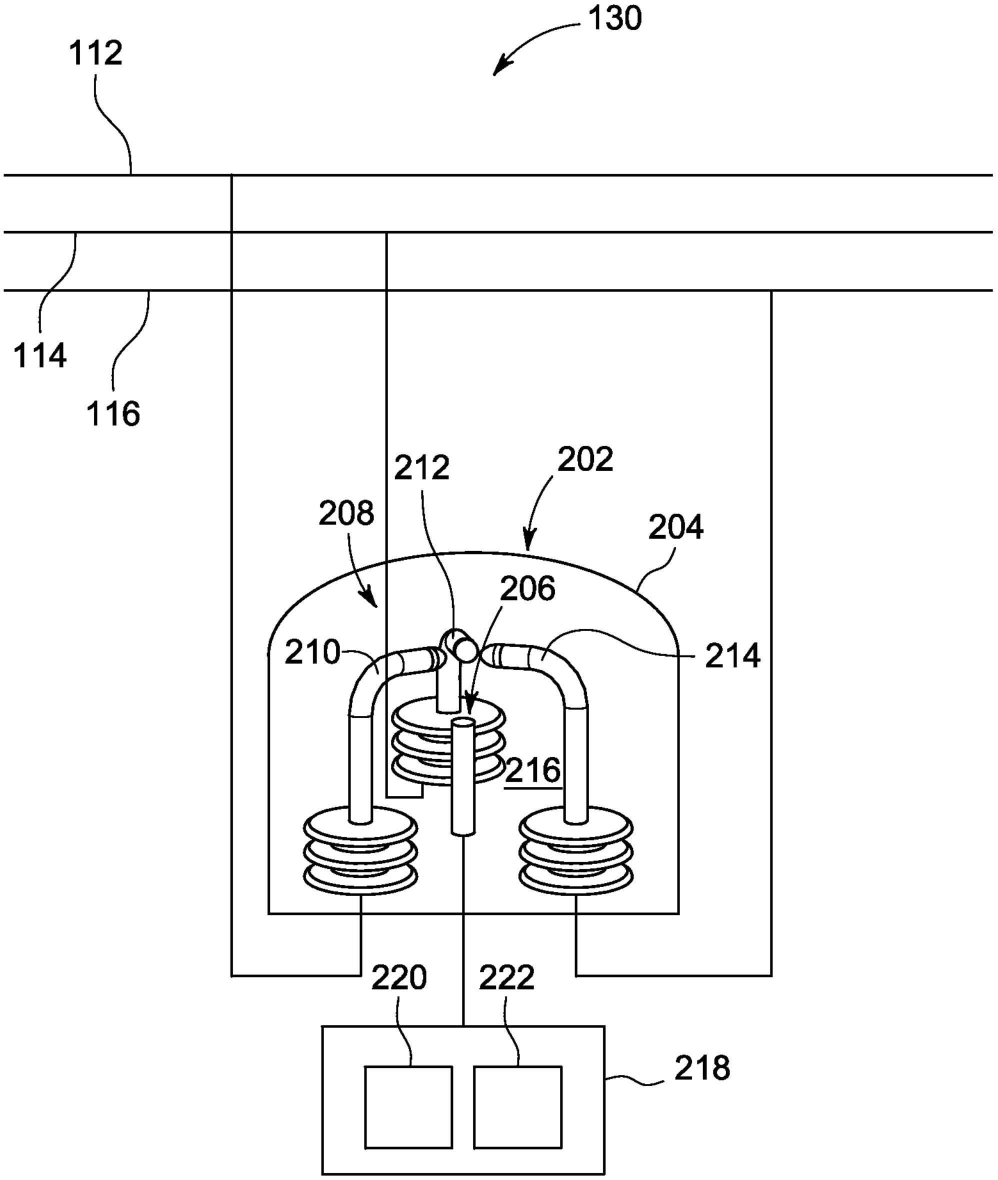
FIG. 2 is a schematic diagram of an exemplary arc mitigation system that may be used with the power distribution system shown in FIG. 1.

FIG. 2 is a schematic diagram of an exemplary arc mitigation system 130 that may be used with power distribution system 100 (shown in FIG. 1). In an exemplary embodiment, arc mitigation system 130 includes an arc mitigation device 202.

In an exemplary embodiment, arc mitigation device 202 is communicatively coupled to controller 122 and is controlled by controller 122. Arc mitigation device 202 includes one or more containment chambers 204 that enclose a plasma generation device 206 (sometimes referred to as a "plasma gun") and a plurality of electrodes 208, such as a first phase electrode 210, a second phase electrode 212, and a third phase electrode 214. More specifically, first phase electrode 210, second phase electrode 212, third phase electrode 214, and plasma generation device 206 are positioned within a cavity 216 defined within containment chamber 204. First phase electrode 210 is coupled to first phase conductor 112, second phase electrode 212 is coupled to second phase conductor 114, and third phase electrode 214 is coupled to third phase conductor 116. In an exemplary embodiment, plasma generation device 206 is a star-configured longitudinal plasma generation device. Alternatively, plasma generation device 206 is configured in any other suitable manner that enables plasma generation device 206 to function as described herein.

In an exemplary embodiment, a trigger circuit 218 is coupled to arc mitigation device 202, and more specifically, to plasma generation device 206, to activate plasma generation device 206. More specifically, trigger circuit 218 receives the activation signal from controller 122 and energizes plasma generation device 206 with a voltage signal and/or a current signal (sometimes referred to as a "trigger signal"). In an exemplary embodiment, trigger circuit 218 is a dual-source circuit that includes a voltage source 220 and a current source 222. In response to the activation signal, voltage source 220 applies a voltage across a plurality of electrodes (not shown) of plasma generation device 206 such that an electrical breakdown of entrapped air and/or other insulative material disposed between the plasma generation device electrodes occurs. In response to the activation signal, current source 222 facilitates producing a flow of high magnitude current, or a high magnitude current pulse, (e.g., between about 1 kiloamperes (kA) and about 10 kA, in one embodiment) having a duration of between about 10 microseconds and about 100 microseconds across the plasma generation device electrodes. The high magnitude current flow within plasma generation device 206 causes high-density ablative plasma to be generated within plasma generation device 206. Plasma generation device 206 is designed to direct or discharge the generated ablative plasma between electrodes 208. In an exemplary embodiment, trigger circuit 218 is positioned outside of containment chamber 204 and is coupled to plasma generation device 206 by a plurality of plasma generation device conductors (not shown in FIG. 2). Alternatively, trigger circuit 218 is positioned within containment chamber 204.

During operation, if an arc flash event 120 occurs, controller 122 (both shown in FIG. 1) transmits an activation signal to plasma generation device 206, and plasma generation device 206 emits ablative plasma into gaps between electrodes 208. The ablative plasma "breaks down," or reduces the dielectric strength of, air or other insulative material between electrodes 208 and causes a low impedance path for current to travel between electrodes 208. The low impedance path has a lower effective impedance than an effective impedance associated with arc flash event 120. Plasma generation device 206 therefore causes the first phase of current to be electrically coupled to the second phase of current, the second phase of current to be electrically coupled to the third phase of current, and/or the third phase of current to be electrically coupled to the first phase of current. Accordingly, current is directed away from arc flash event 120 to electrodes 208 such that an arc is formed between electrodes 208. The energy of arc flash event 120 is discharged, therefore, within containment chamber 204, thus transferring the energy from the location of arc flash event 120 to the arc within arc mitigation device 202 and mitigating the otherwise undesired consequences of arc flash event 120 within equipment protection system 118 and/or power distribution system 100.

The arc or arcs generated within containment chamber 204 (i.e., within cavity 216) may cause air or other gases within cavity 216 to be expanded rapidly causing the gases to be heated and increase in pressure. In addition, electrodes 208 may at least partially erode and cause metal shrapnel to be formed. As described more fully herein, plasma generation device 206 is substantially sealed, or airtight, such that the heated gases surrounding plasma generation device 206 are prevented from entering, or flowing through, plasma generation device 206. Rather, the heated gases are discharged through vents (not shown) of containment chamber 204. Accordingly, the large amount of energy that may be present during an arc flash event 120 may be discharged within containment chamber 204 rather than being discharged in an unrestrained manner at the site of arc flash event 120. Damage to components of equipment protection system 118 and/or power distribution system 100 from arc flash event 120 is facilitated to be reduced.

Figure 3:
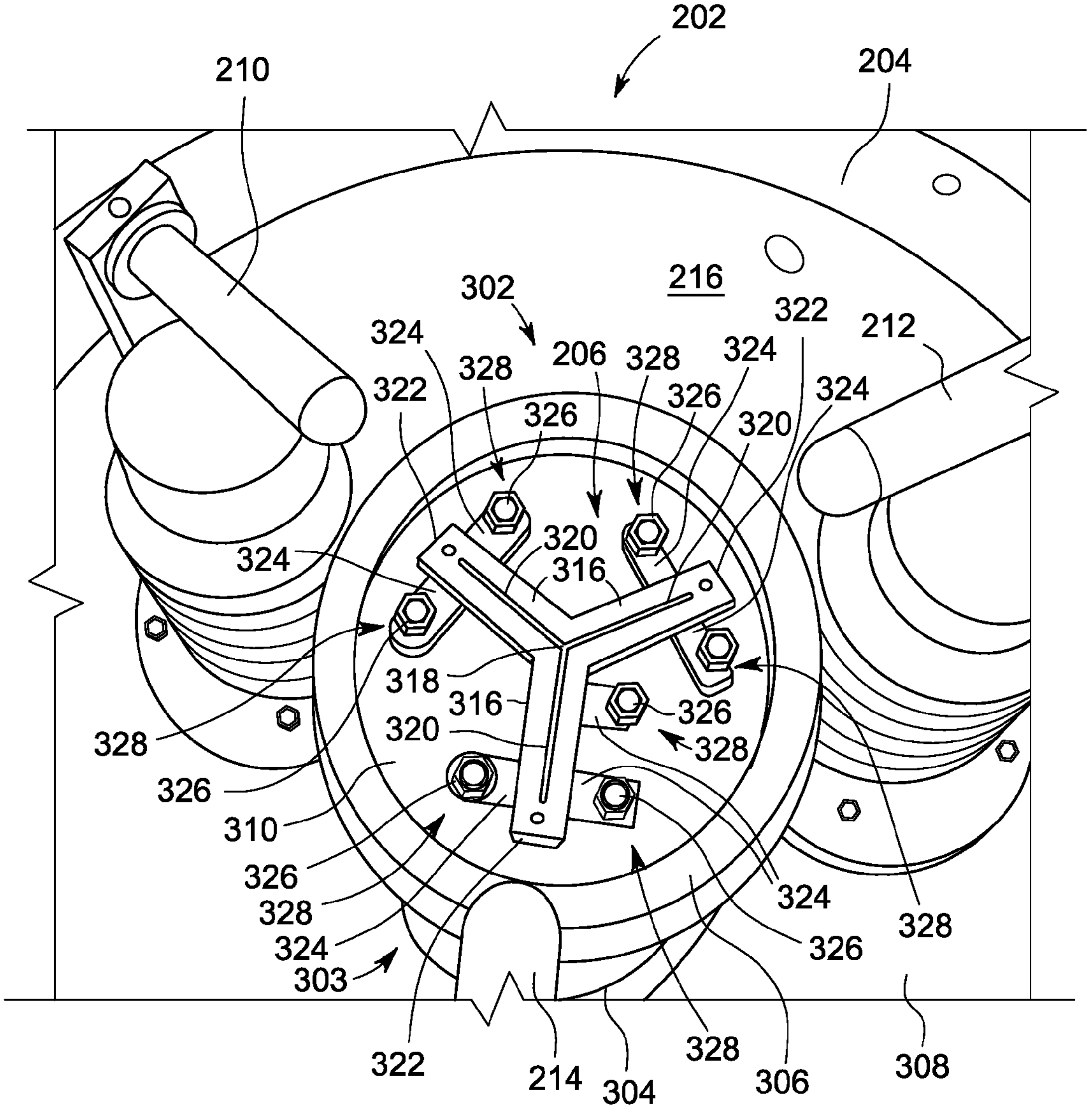
FIG. 3 is a perspective top view of an exemplary arc mitigation device including a plasma generation device assembly that may be used with the power distribution system shown in FIG. 1.
Figure 4:
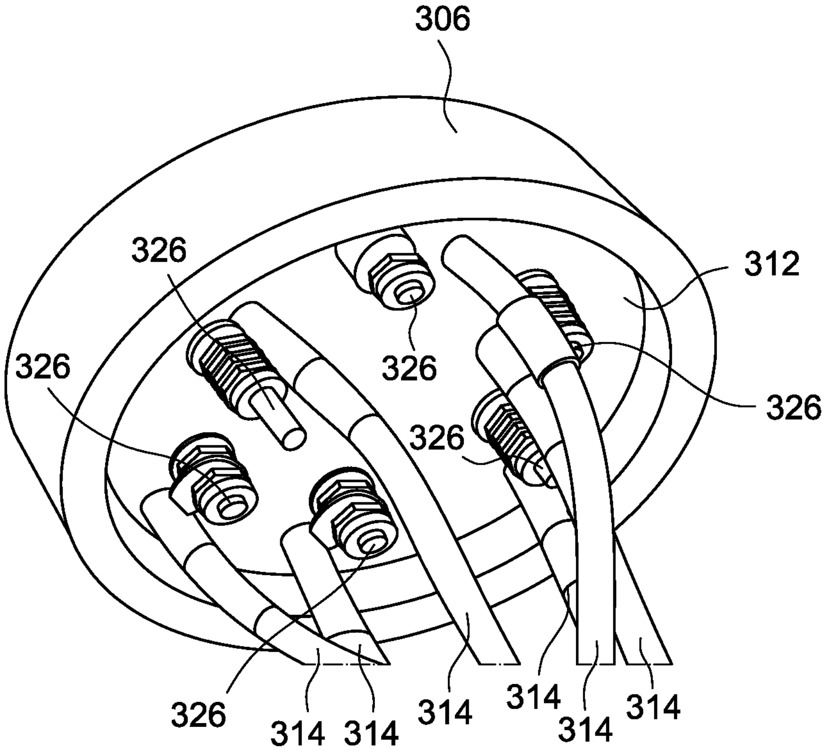
FIG. 4 is a perspective bottom view of a portion of the plasma generation device assembly shown in FIG. 3.

FIG. 3 is a perspective top view of an exemplary arc mitigation device 202 including a plasma generation device assembly 302 that may be used with power distribution system 100 (shown in FIG. 1). FIG. 4 is a perspective bottom view of a portion of plasma generation device assembly 302. In an exemplary embodiment, plasma generation device assembly 302 is positioned with respect to first phase electrode 210, second phase electrode 212, and third phase electrode 214 of arc mitigation device 202. In an exemplary embodiment, plasma generation device assembly 302 is installed within equipment protection system 118.

Plasma generation device assembly 302 includes plasma generation device 206 and a base 303. Base 303 includes a pedestal 304 and a cap 306 that is coupled to pedestal 304. More specifically, cap 306 is sealingly coupled to pedestal 304 to prevent gases, such as air, from entering an interior portion defined within cap 306 and/or pedestal 304 from cavity 216 surrounding plasma generation device 206.

Pedestal 304 is positioned within cavity 216 and is coupled to a base 308 of containment chamber 204. Cap 306 is coupled to pedestal, and cap 306 includes a top surface 310 (shown in FIG. 3) and a bottom surface 312 (shown in FIG. 4). More specifically, cap 306 is coupled to pedestal 304 at, or adjacent to, bottom surface 312. Pedestal 304 is substantially hollow to enable a plurality of plasma generation device conductors 314 to extend through pedestal 304 for coupling to trigger circuit 218 (shown in FIG. 2). In an exemplary embodiment, pedestal 304 and cap 306 are manufactured from an insulative material, such as polytetrafluoroethylene or a polyamide material such as nylon or from a composite material (i.e., a combination of metal and polymer). Alternatively, pedestal 304 and/or cap 306 are manufactured from any other suitable material that has high dielectric properties, arc resistance, structural strength, thermal strength, and/or low flammability.

Referring to FIG. 3, plasma generation device 206 is coupled to top surface 310 of cap 306 such that plasma generation device 206 extends into cavity 216. Plasma generation device 206 includes a plurality of arms 316 extending outward from a center 318 of plasma generation device 206 to form a substantially triangular, or star, shape. A slot 320 is formed within each arm 316, and each slot 320 extends from center 318 towards an end 322 of an associated arm 316. In an exemplary embodiment, ablative plasma generated during the operation of plasma generation device 206 is discharged through slots 320 into cavity 216, towards first phase electrode 210, second phase electrode 212, and third phase electrode 214.

In an exemplary embodiment, arms 316 are manufactured from an ablative material, such as an ablative polymer, and/or any other material that enables arc mitigation device 202 to function as described herein. At least a portion of the ablative material of arms 316 is ablated and discharged towards first phase electrode 210, second phase electrode 212, and/or third phase electrode 214 when an arc flash event 120 is detected and a trigger signal is generated by trigger circuit 218, as described more fully herein.

Plasma generation device 206 includes a plurality of terminals 324 extending from plasma generation device arms 316. More specifically, as described more fully herein, a pair of plasma generation device terminals 324 is coupled to each arm 316 to provide a voltage differential or bias for each arm 316. In an exemplary embodiment, the pairs of plasma generation device terminals 324 are coupled to current source 222 (shown in FIG. 2) by plasma generation device conductors 314. In addition, at least one plasma generation device terminal 324 is coupled to voltage source 220 (shown in FIG. 2) by at least one plasma generation device conductor 314. Each plasma generation device terminal 324 is also coupled to cap 306 by a coupling member 326 such that plasma generation device 206 is coupled to cap 306 by coupling members 326.

In an exemplary embodiment, coupling members 326 include, without limitation, one or more bolts, nuts, studs, pins, screws, and/or any other component that enables terminals 324 to be coupled to cap 306. Coupling members 326 are inserted through apertures or openings 328 defined in cap 306 such that coupling members 326 (and openings 328) extend from top surface 310 to bottom surface 312. In one embodiment, coupling members 326 removably couple terminals 324 to cap 306. In addition, coupling members 326 substantially seal openings 328 when coupling members 326 are inserted therethrough to sealingly couple terminals 324 and plasma generation device 206 to cap 306. Accordingly, air or other gases within cavity 216 are prevented from entering, or flowing through, openings 328 in cap 306.

In addition, in an exemplary embodiment, coupling members 326 (and openings 328 in cap 306) are threaded to enable plasma generation device 206 to be adjusted (i.e., raised or lowered) with respect to cap 306 and to facilitate making cap 306 airtight. Accordingly, a distance between plasma generation device 206 and first phase electrode 210, second phase electrode 212, and/or third phase electrode 214 may be adjusted by adjusting (e.g., screwing or unscrewing) coupling members 326 within openings 328 of cap 306.

Referring to FIG. 4, plasma generation device conductors 314 are coupled to plasma generation device 206 by coupling members 326. More specifically, a plasma generation device conductor 314 is coupled to each plasma generation device terminal 324 by a coupling member 326 at bottom surface 312 of cap 306. Each plasma generation device conductor 314 extends through pedestal 304 and is coupled to trigger circuit 218 (i.e., to voltage source 220 or current source 222). Accordingly, plasma generation device conductors 314 are protected, by pedestal 304 and cap 306, from hot gases and/or arcs formed within cavity 216.

Figure 5:
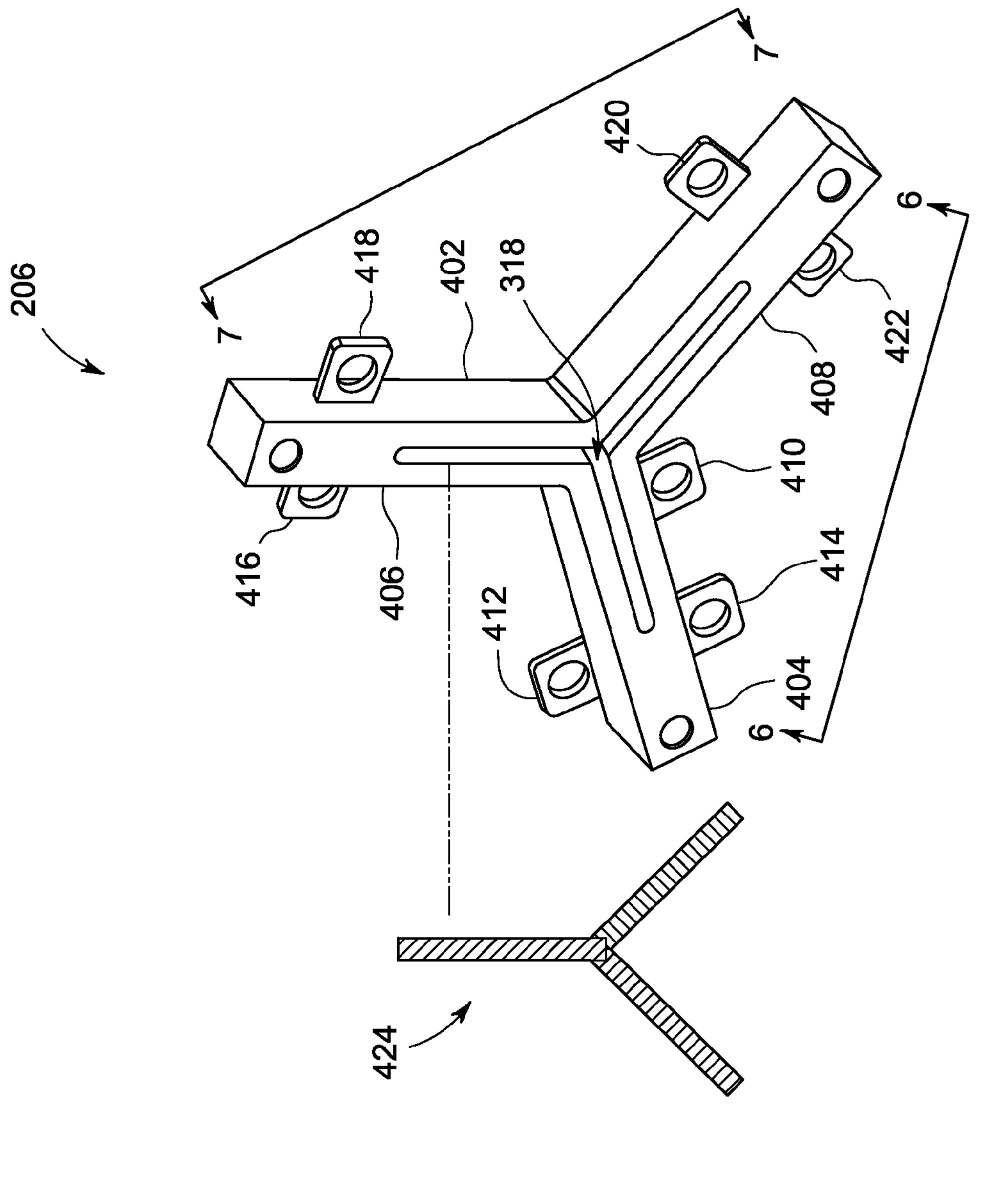
FIG. 5 is a perspective view of an exemplary plasma generation device that may be used with the plasma generation device assembly shown in FIG. 3.

FIG. 5 is a perspective view of an exemplary plasma generation device 206 that may be used with plasma generation device assembly 302 (shown in FIG. 3). In an exemplary embodiment, plasma generation device 206 includes a body 402 including a first arm 404, a second arm 406, and a third arm 408 extending from center 318. In addition, plasma generation device 206 includes a plurality of plasma generation device terminals 324 (also known as plasma generation device electrodes), such as a first terminal 410, a second terminal 412, a third terminal 414, a fourth terminal 416, a fifth terminal 418, a sixth terminal 420, and a seventh terminal 422. In an exemplary embodiment, first terminal 410, second terminal 412, and third terminal 414 are coupled to, and extend from, first arm 404. Fourth terminal 416 and fifth terminal 418 are coupled to, and extend from, second arm 406, and sixth terminal 420 and seventh terminal 422 are coupled to, and extend from, third arm 408. First terminal 410 is coupled to voltage source 220, and the remaining terminals 324 are coupled to current source 222 (both shown in FIG. 2).

Plasma generation device body 402 is unitarily formed from an ablative material, such as, without limitation, a polyoxymethylene material or a polytetrafluoroethylene material. Accordingly, plasma generation device 206 does not include different layers of material (e.g., ablative layers and electrode layers) as compared to prior art plasma generation devices, and body 402 as a whole may be used to generate ablative plasma during operation of plasma generation device 206. In one embodiment, plasma generation device body 402 is molded using a die or a mold that has placeholders or cut-outs for terminals 324. Alternatively, plasma generation device body 402 is cast using a suitable casting process. Terminals 324 are formed from a conductive material, such as copper or another metal. In one embodiment, terminals 324 are placed in the die or the mold that forms plasma generation device body 402 and are coupled to, or integrally formed with, plasma generation device body 402 during the molding of plasma generation device body 402.

As used herein, the term “unitarily forming” refers to forming a component, such as plasma generation device body 402, from a single material such that the body forms one unitary piece or component. For example, plasma generation device body 402 is unitarily formed from a single ablative material, in contrast to at least some known plasma generation device bodies that include alternating layers of ablative material and electrode material that are glued together.

In an exemplary embodiment, a cover 424 or a shield is coupled to plasma generation device body 402 to at least partially cover slots 320. Cover 424 is configured to enable ablative plasma to pass through cover and to be discharged towards first phase electrode 210, second phase electrode 212, and/or third phase electrode 214 during operation of plasma generation device 206. In addition, cover 424 is configured to prevent particulates and/or other debris from entering slots 320. In one embodiment, cover 424 is a mesh having openings suitably sized to enable ablative plasma to pass through the openings and to prevent debris from entering through the openings. In another embodiment, cover 424 is a one-way cover 424 that enables material (e.g., ablative plasma) to pass through in a first direction (e.g., from slots 320 towards first phase electrode 210, second phase electrode 212, and/or third phase electrode 214) and that prevents material (e.g., debris) from passing through in a second direction (e.g., from first phase electrode 210, second phase electrode 212, and/or third phase electrode 214 towards slots 320). Accordingly, cover 424 reduces or prevents debris from clogging slots 320 and/or from causing undesired shorts between terminals of plasma generation device 206.

Figure 6:
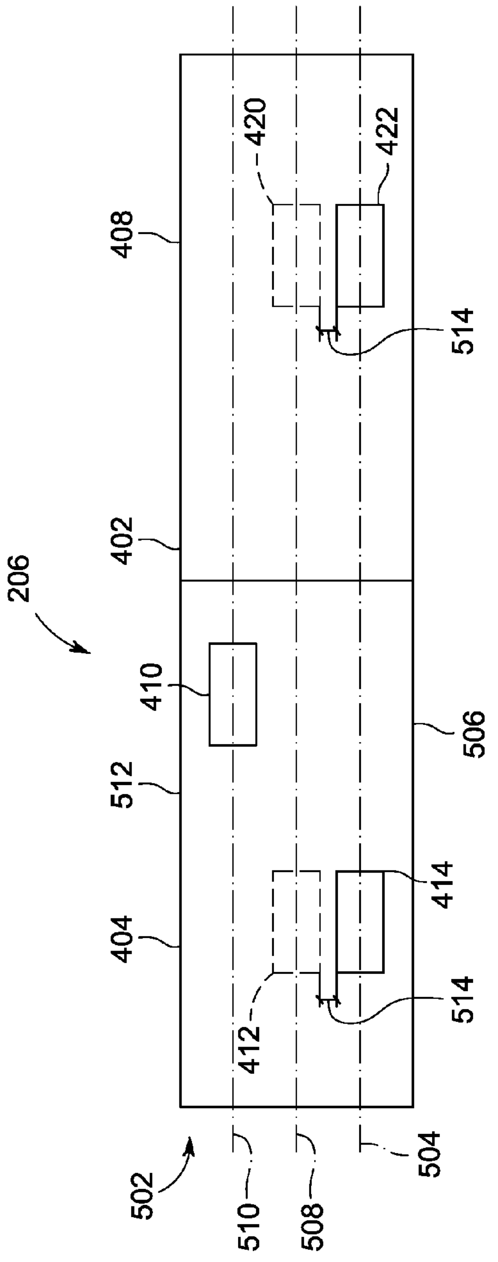
FIG. 6 is a sectional view of a portion of the plasma generation device shown in FIG. 5.
Figure 7:
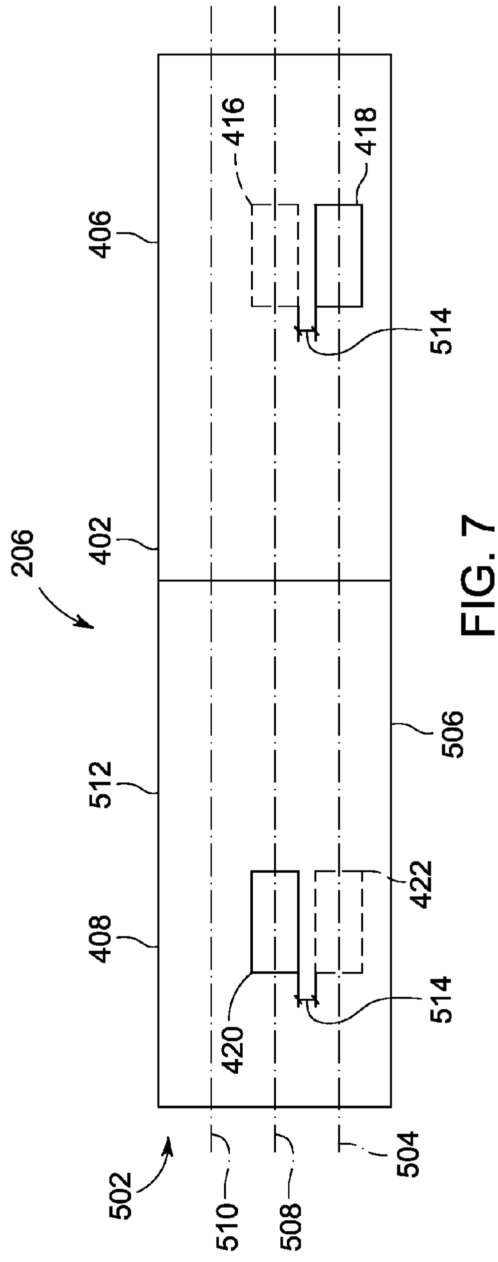
FIG. 7 is a sectional view of another portion of the plasma generation device shown in FIG. 5.

FIG. 6 is a sectional view of plasma generation device 206 (shown in FIG. 5) taken along line 6-6. FIG. 7 is a sectional view of plasma generation device 206 (shown in FIG. 6) taken along line 7-7.

Referring to FIGS. 6 and 7, plasma generation device terminals 324 are positioned along, and aligned with, a plurality of planes 502 extending longitudinally through first arm 404, second arm 406, and third arm 408. In an exemplary embodiment, a first plane 504 is defined proximate a bottom surface 506 of plasma generation device 206, a second plane 508 is defined above first plane 504, and a third plane 510 is defined above second plane 508 and proximate a top surface of plasma generation device 206. Bottom surface 506 is coupled to top surface 310 of cap 306 (shown in FIG. 3), and a top surface 512 of plasma generation device 206 faces first phase conductor 112, second phase conductor 114, and/or third phase conductor 116. In an exemplary embodiment, each plane 502 is parallel, or substantially parallel, to each other plane 502, to bottom surface 506, and to top surface 512. As used herein, the terms “above” refers to a direction from bottom surface 506 towards top surface 512 of plasma generation device 206.

In an exemplary embodiment, third terminal 414, fifth terminal 418, and seventh terminal 422 are positioned along first plane 504. Second terminal 412, fourth terminal 416, and sixth terminal 420 are positioned along second plane 508, and first terminal 410 is positioned along third plane 510. In addition, pairs of terminals 324 coupled to current source 222 are spaced apart a substantially uniform distance 514. More specifically, second terminal 412 is spaced apart from third terminal 414 by distance 514, fourth terminal 416 is spaced apart from fifth terminal 418 by distance 514, and sixth terminal 420 is spaced apart from seventh terminal 422 by distance 514. Accordingly, current source 222 generates a substantially uniform voltage between associated pairs of plasma generation device terminals 324 to facilitate generating ablative plasma from each of first arm 404, second arm 406, and third arm 408.

Figure 8:
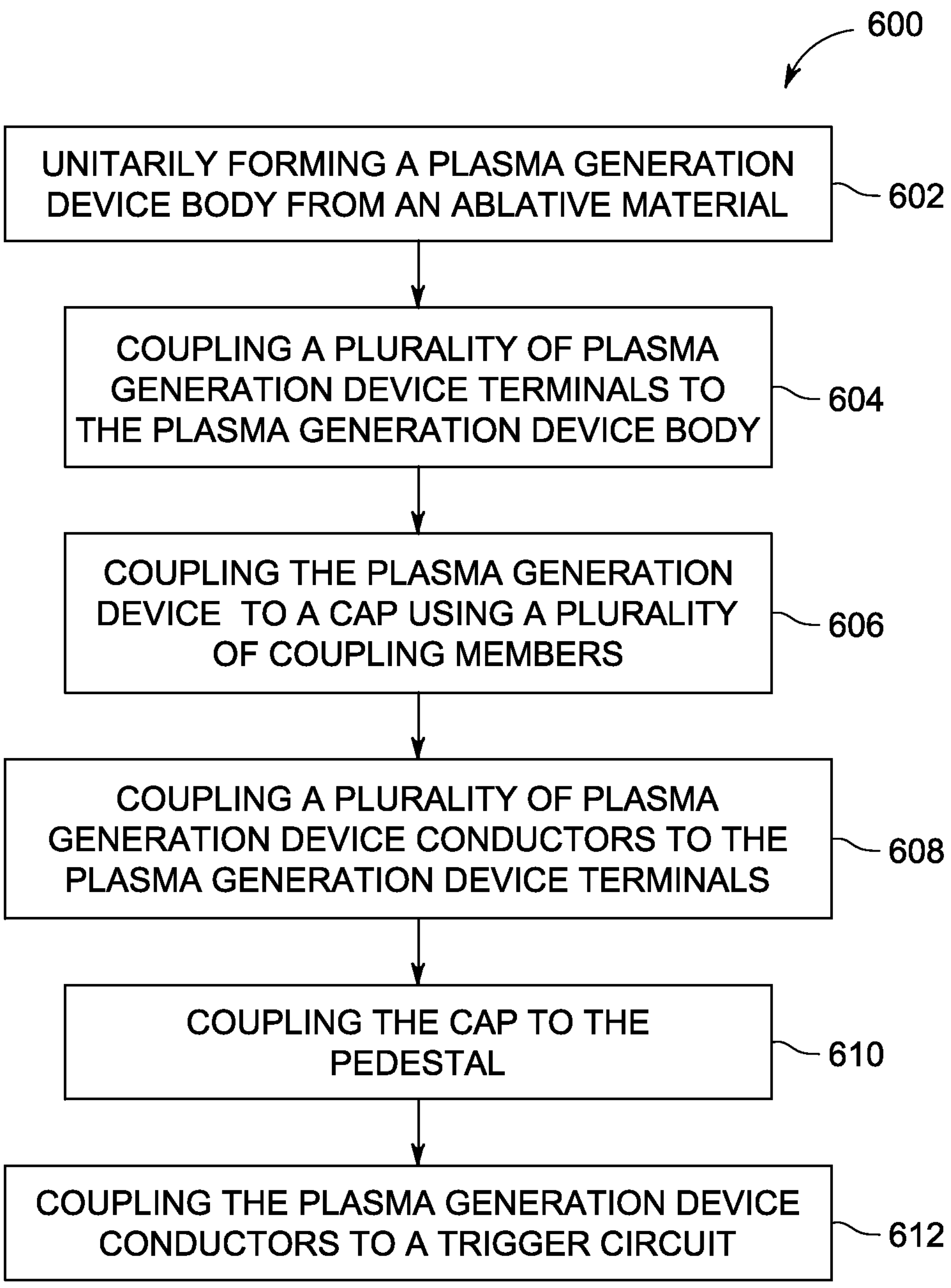
FIG. 8 is a flow diagram of an exemplary method of assembling a portion of an arc mitigation device that may be used to assemble the plasma generation device assembly shown in FIG. 3.

FIG. 8 is a flowchart of an exemplary method 600 of assembling at least a portion of an arc mitigation device, such as arc mitigation device 202 (shown in FIG. 2). For example, method 600 may be used to assemble plasma generation device assembly 302 (shown in FIG. 3).

Method 600 includes unitarily forming 602 plasma generation device body 402 from an ablative material, such as a polyoxymethylene material or a polytetrafluoroethylene material. A plurality of plasma generation device terminals 324 is coupled 604 to plasma generation device body 402. In an exemplary embodiment, plasma generation device terminals 324 are positioned along a plurality of planes 502 extending longitudinally through the arms of plasma generation device body 402. In one embodiment, plasma generation device terminals 324 are coupled to plasma generation device body 402 during a molding process (i.e., when plasma generation device body 402 is unitarily formed 602 from the ablative material) such that terminals 324 and plasma generation device body 402 are integrally formed together.

Plasma generation device 206 is coupled 606 to cap 306 using a plurality of coupling members 326. More specifically, coupling members 326 are inserted through openings 328 defined within cap 306 to seal openings 328.

A plurality of plasma generation device conductors 314 are coupled 608 to plasma generation device terminals 324. Plasma generation device conductors 314 are extended through pedestal 304, and cap 306 is coupled 610 to pedestal 304. Plasma generation device conductors 314 are coupled 612 to a trigger circuit 218 to enable trigger circuit 218 to activate plasma generation device 206 in response to a detected arc flash event 120.

Figure 9:
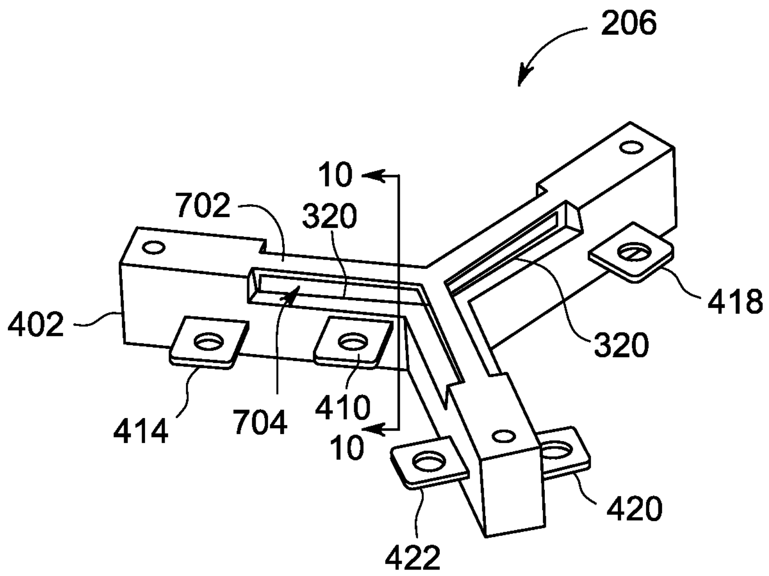
FIG. 9 is a perspective view of the plasma generation device shown in FIG. 2 and an exemplary cover for the plasma generation device.
Figure 10:
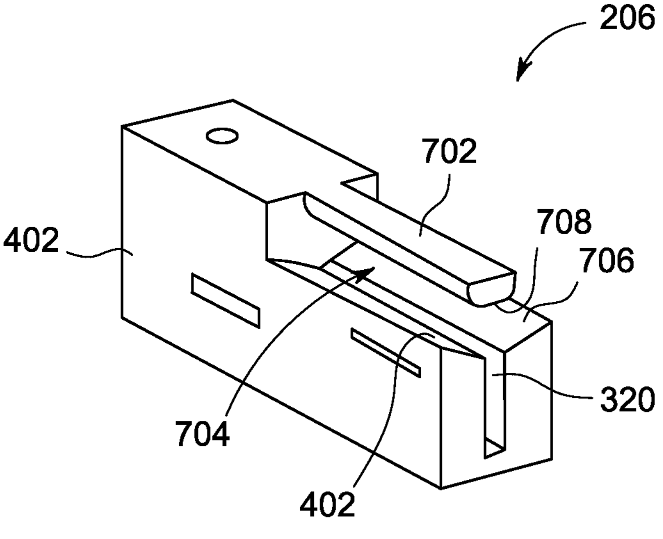
FIG. 10 is a cross-sectional view of a portion of the plasma generation device and the cover shown in FIG. 9 taken along line 10-10.

FIG. 9 is a perspective view of plasma generation device 206 including an exemplary cover 702 or shield. Unless otherwise specified, cover 702 may be used in place of cover 424 (shown in FIG. 5) and cover 702 operates substantially similar with respect to cover 424. FIG. 10 is a cross-sectional view of a portion of plasma generation device 206 and cover 702 taken along line 10-10.

As illustrated in FIG. 9, a gap 704 is defined between cover 702 and plasma generation device body 402 such that slots 320 are at least partially open to, or in flow communication with, cavity 216 (shown in FIG. 2) when plasma generation device 206 is positioned within cavity 216. Cover 702 facilitates increasing a reliability of plasma generation device 206 by blocking an accumulation or entry of soot, shrapnel, molten metal, and/or other debris from slots 320.

As illustrated in FIG. 10, plasma generation device body 402 includes a pair of slanted portions 706 extending outwardly and obliquely from each slot 320, and a bottom surface 708 of cover 702 facing slot 320 is at least partially slanted. Slanted portions 706 of plasma generation device body 402 and bottom surface 708 facilitate spreading plasma generated by plasma generation device 206 into cavity 216.

Figure 11:
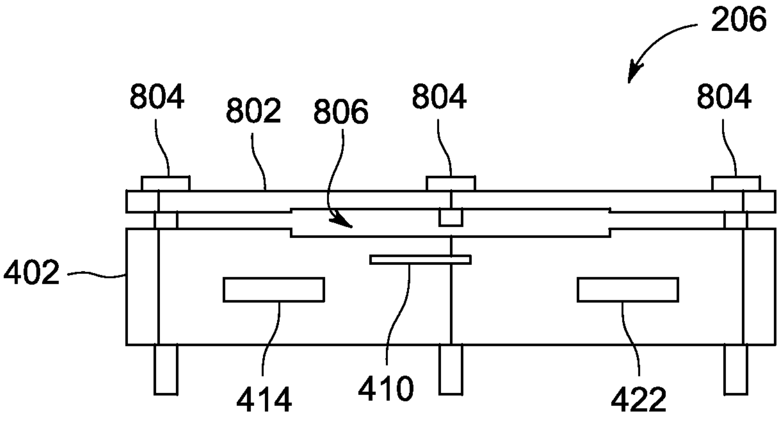
FIG. 11 is a side view of the plasma generation device shown in FIG. 2 and another exemplary cover for the plasma generation device with the cover in an extended position.
Figure 12:
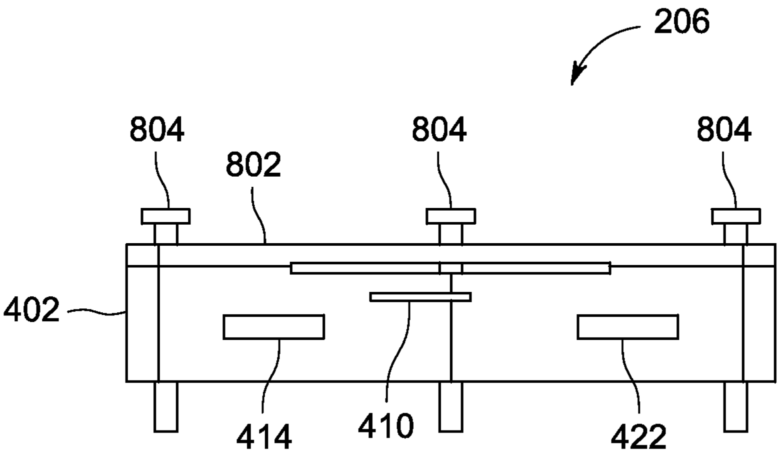
FIG. 12 is a side view of the plasma generation device and the cover shown in FIG. 11 with the cover in a retracted position.

FIG. 11 is a side view of plasma generation device 206 including another exemplary cover 802 or shield in an extended (or raised) position. Unless otherwise specified, cover 802 may be used in place of cover 702 (shown in FIG. 9) and cover 802 operates substantially similar with respect to cover 702. FIG. 12 is a side view of plasma generation device 206 with cover 802 in a retracted (or lowered) position.

As illustrated in FIGS. 11 and 12, cover 802 is movable in relation to plasma generation device body 402. Cover 802 includes a plurality of fasteners 804 that enable cover 802 to move vertically with respect to plasma generation device body 402. Fasteners 804 limit the movement of cover 802 such that cover 802 is prevented from rising above the extended position shown in FIG. 11. In the retracted position shown in FIG. 12, cover 802 is substantially flush (i.e., in contact) with plasma generation device body 402. It should be recognized that in the extended position, a gap 806 is defined between cover 802 and plasma generation device body 402.

During operation, an expulsion of plasma generated by plasma generation device 206 through slots 320 (shown in FIG. 3) causes cover 802 to move into the extended position. The plasma is directed out of plasma generation device 206 through gap 806 and into cavity 216. When plasma generation device 206 is not generating plasma, a weight of cover 802 causes cover 802 to move to the retracted position. In one embodiment, a biasing member (not shown), such as a spring, is coupled to cover 802 and to plasma generation device body 402. The biasing member causes cover 802 to move to the retracted position when plasma generation device 206 is not generating plasma.

Exemplary embodiments of a plasma generation device assembly, an arc mitigation device, and a method of assembling a plasma generation device assembly are described above in detail. The plasma generation device assembly, arc mitigation device, and method are not limited to the specific embodiments described herein but, rather, steps of the method and/or components of the plasma generation device assembly and/or arc mitigation device may be utilized independently and separately from other steps and/or components described herein. Further, the described steps and/or components may also be defined in, or used in combination with, other systems, methods, and/or devices, and are not limited to practice with only the systems and method as described herein.

Although the present invention is described in connection with an exemplary power distribution system, embodiments of the invention are operational with numerous other power systems, or other systems or devices. The power distribution system described herein is not intended to suggest any limitation as to the scope of use or functionality of any aspect of the invention. In addition, the power distribution system described herein should not be interpreted as having any dependency or requirement relating to any one or combination of components illustrated in the exemplary operating environment.

The order of execution or performance of the steps in the embodiments of the invention illustrated and described herein is not essential, unless otherwise specified. That is, the steps may be performed in any order, unless otherwise specified, and embodiments of the invention may include additional or fewer steps than those disclosed herein. For example, it is contemplated that executing or performing a particular step before, contemporaneously with, or after another step is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A plasma generation device assembly for use in an arc mitigation device having a containment chamber, said plasma generative device comprising:

a base comprising a top surface;

a plasma generation device comprising:

a body unitarily formed from an ablative material; and a plurality of plasma generation device terminals electrically coupled to said body for transmitting at least one of a voltage and a current to said body to generate ablative plasma when said plasma generation device is activated, wherein said body comprises a plurality of arms, each arm of said plurality of arms electrically coupled to at least two plasma generation device terminals of said plurality of plasma generation device terminals; and a plurality of coupling members configured to couple said plasma generation device to said top surface.

2. A plasma generation device assembly in accordance with claim 1, wherein said body comprises at least one slot formed within a top surface of said body.

3. A plasma generation device assembly in accordance with claim 2, further comprising a slot cover configured to be coupled to said body and at least partially cover the at least one slot.

4. A plasma generation device assembly in accordance with claim 3, wherein said body includes at least one slanted portion extending obliquely from the at least one slot.

5. A plasma generation device assembly in accordance with claim 3, wherein said slot cover is movable in relation to said body.

6. A plasma generation device assembly in accordance with claim 5, wherein said slot cover is movably coupled to said body.

7. A plasma generation device assembly in accordance with claim 6, wherein said slot cover is movable between a retracted position and an extended position, and wherein a biasing member is coupled to said slot cover and said plasma generation device body.

8. A plasma generation device assembly in accordance with claim 7, further comprising at least one fastener configured to movably couple said slot cover to said body such that said slot cover is movable between the retracted position and the extended position, said at least one fastener further configured to prevent said slot cover from moving beyond the extended position.

9. A plasma generation device assembly in accordance with claim 1, wherein said plurality of plasma generation device terminals are positioned along a plurality of planes extending longitudinally through said plurality of arms.

10. A plasma generation device assembly in accordance with claim 9, wherein said plurality of plasma generation device terminals comprises a first plurality of plasma generation device terminals and a second plurality of plasma generation device terminals, wherein said first plurality of plasma generation device terminals is positioned along a first plane of the plurality of planes, and said second plurality of plasma generation device terminals is positioned along a second plane of the plurality of planes.

11. A plasma generation device assembly in accordance with claim 10, wherein the first plane is parallel to the second plane.

12. A plasma generation device assembly in accordance with claim 1, wherein said body is formed from one of a polyoxymethylene material and a polytetrafluoroethylene material.

13. An arc mitigation device for use in discharging energy from an electrical fault, said arc mitigation device comprising:

a containment chamber;

a plurality of electrodes positioned within said containment chamber; and a plasma generation device assembly positioned within said containment chamber and comprising:

a base comprising a top surface;

a plasma generation device comprising:

a body unitarily formed from an ablative material; and a plurality of plasma generation device terminals electrically coupled to said body for transmitting at least one of a voltage and a current to said body to generate ablative plasma when said plasma generation device is activated, wherein said body comprises a plurality of arms, said plurality of plasma generation device terminals positioned along a plurality of planes extending longitudinally through said plurality of arms; and a plurality of coupling members configured to couple said plasma generation device to said top surface.

14. An arc mitigation device in accordance with claim 13, wherein said body comprises at least one slot formed within a top surface of said body.

15. An arc mitigation device in accordance with claim 14, further comprising a slot cover configured to be coupled to said body and at least partially cover the at least one slot.

16. An arc mitigation device in accordance with claim 15, wherein said body includes at least one slanted portion extending obliquely from the at least one slot.

17. An arc mitigation device in accordance with claim 15, wherein said slot cover is movable in relation to said body.

18. An arc mitigation device in accordance with claim 17, wherein said slot cover is movably coupled to said body.

19. An arc mitigation device in accordance with claim 18, wherein said slot cover is movable between a retracted position and an extended position.

20. An arc mitigation device in accordance with claim 19, further comprising at least one fastener configured to movably couple said slot cover to said body such that said slot cover is movable between the retracted position and the extended position, said at least one fastener further configured to prevent said slot cover from moving beyond the extended position.

21. An arc mitigation device in accordance claim 13, wherein each arm of said plurality of arms is electrically coupled to at least two plasma generation device terminals of said plurality of plasma generation device terminals.

22. An arc mitigation device in accordance with claim 13, wherein said plurality of plasma generation device terminals comprises a first plurality of plasma generation device terminals and a second plurality of plasma generation device terminals, wherein said first plurality of plasma generation device terminals is positioned along a first plane of the plurality of planes, and said second plurality of plasma generation device terminals is positioned along a second plane of the plurality of planes.

23. An arc mitigation device in accordance with claim 22, wherein the first plane is parallel to the second plane.

24. An arc mitigation device in accordance with claim 13, wherein said body is formed from one of a polyoxymethylene material and a polytetrafluoroethylene material.

25. A method of assembling a plasma generation device assembly, said method comprising:

unitarily forming a body of a plasma generation device from an ablative material;

electrically coupling a plurality of plasma generation device terminals to the body for transmitting at least one of a voltage and a current to the body to generate ablative plasma when the plasma generation device is activated, wherein the body comprises a plurality of arms, each arm of the plurality of arms electrically coupled to at least two plasma generation device terminals of the plurality of plasma generation device terminals;

coupling the body to a top surface of a base using a plurality of coupling members, wherein the top surface is defined by a cap of the base;

coupling a plurality of plasma generation device conductors to the plurality of terminals; and coupling the cap to a pedestal.

26. A method in accordance with claim 25, further comprising coupling the plurality of plasma generation device conductors to a trigger circuit to enable the plasma generation device to be activated by the trigger circuit, wherein the plasma generation device is configured to discharge ablative plasma when the plasma generation device is activated.

27. A method in accordance with claim 25, wherein the body is unitarily formed with at least one slot defined in the body.

28. A method in accordance with claim 25, further comprising coupling a cover to the body to at least partially cover the at least one slot, wherein the cover is configured to reduce an amount of debris entering the at least one slot and to permit ablative plasma to be discharged from the at least one slot.

29. A method in accordance with claim 25, further comprising installing the plasma generation device assembly within a switchgear unit.

* * * * *